US012635605B2

(12) United States Patent
Sorenson et al.

(10) Patent No.: US 12,635,605 B2
(45) Date of Patent: May 26, 2026

(54) SENSOR, SENSOR HOUSING, AND ATTACHMENT FOR MONITORING BIN PRODUCT LEVEL

(71) Applicant: BIN SLIDE, LLC, Ankeny, IA (US)

(72) Inventors: Joshua Sorenson, Ankeny, IA (US);
Jim Ryken, Urbandale, IA (US);
Michael Hansen, Urbandale, IA (US)

(73) Assignee: BIN SLIDE, LLC, Ankeny, IA (US)

( * ) Notice: Subject to any disclaimer, the term of this patent is extended or adjusted under 35 U.S.C. 154(b) by 27 days.

(21) Appl. No.: 18/419,964

(22) Filed: Jan. 23, 2024

(65) Prior Publication Data

US 2024/0245000 A1 Jul. 25, 2024

Related U.S. Application Data

(60) Provisional application No. 63/481,222, filed on Jan. 24, 2023.

(51) Int. Cl.
*A01D 41/127* (2006.01)
*G01F 23/00* (2022.01)
*G01F 23/80* (2022.01)

(52) U.S. Cl.
CPC ..... *A01D 41/1275* (2013.01); *G01F 23/0046* (2013.01); *G01F 23/802* (2022.01)

(58) Field of Classification Search
CPC ............. A01D 41/1275; G01F 23/802; G01F 23/0046
USPC ....................................................... 340/617
See application file for complete search history.

(56) References Cited

U.S. PATENT DOCUMENTS

| | | | | |
|---|---|---|---|---|
| 5,687,635 | A † | 11/1997 | Stockton | |
| 6,986,294 | B2 | 1/2006 | Fromme et al. | |
| 7,284,428 | B1 * | 10/2007 | Hoben | G01F 23/14 |
| | | | | 73/431 |
| 8,350,411 | B2 | 1/2013 | Kimball et al. | |
| 9,022,063 | B2 * | 5/2015 | Powell | G01F 1/64 |
| | | | | 222/196 |
| 9,897,720 | B2 | 2/2018 | Faber et al. | |
| 10,384,866 | B2 | 8/2019 | Joosten et al. | |
| 11,346,700 | B2 * | 5/2022 | Montplaisir | E04H 7/22 |
| 2013/0042919 | A1 † | 2/2013 | Lambke | |
| 2013/0293388 | A1 | 11/2013 | Ingalsbe et al. | |
| 2017/0038231 | A1 † | 2/2017 | Ebbing | |
| 2017/0052054 | A1 * | 2/2017 | Merker | G01S 7/521 |
| 2018/0295782 | A1 * | 10/2018 | Dawoud | A01C 15/003 |

(Continued)

FOREIGN PATENT DOCUMENTS

| | | | |
|---|---|---|---|
| CA | 2418521 | A1 | 8/2003 |
| JP | 2019002899 | A | 1/2019 |
| WO | 2014202630 | A1 | 12/2014 |

*Primary Examiner* — Kerri L McNally
(74) *Attorney, Agent, or Firm* — ZarleyConley PLC

(57) ABSTRACT

A bin level monitoring system utilizes an optical sensor housed in a housing. The housing is attached at or near the opening of a bin or other storage structure without the need for a hanging bracket. The sensor housing can be clipped or directly attached to the bin opening or lid of the bin, such as at the lip of the opening. The shape of the housing aids in directing the particulate material into the bin housing, while protecting the sensor. The location of the sensor and housing provides ideal location to best monitor and evaluate the amount or volume of material product in the bin at a given time.

19 Claims, 17 Drawing Sheets

(56)  References Cited

U.S. PATENT DOCUMENTS

| | | | |
|---|---|---|---|
| 2019/0056258 A1* | 2/2019 | Gelada Camps | ..... G01F 23/292 |
| 2019/0339106 A1† | 11/2019 | Sullivan | |
| 2022/0026258 A1* | 1/2022 | Schwartzentruber | ... H04W 4/38 |

\* cited by examiner
† cited by third party

SENSOR, SENSOR HOUSING, AND ATTACHMENT FOR MONITORING BIN PRODUCT LEVEL

CROSS REFERENCE TO RELATED APPLICATIONS

This application claims priority under 35 U.S.C. § 119 to provisional patent application U.S. Ser. No. 63/481,222, filed Jan. 24, 2023. The provisional patent application is herein incorporated by reference in its entirety, including without limitation, the specification, claims, and abstract, as well as any figures, tables, appendices, or drawings thereof.

TECHNICAL FIELD

The invention relates generally to the storage and delivery of particulate material and, more particularly, to the storage and delivery of agricultural feed material. More particularly, but not exclusively, the invention relates to a system, apparatus, and/or corresponding method for monitoring the level of a granular product in a bin other storage facility, as well as the attachment of the sensor and sensor housing to a bin.

BACKGROUND

The background description provided herein gives context for the present disclosure. Work of the presently named inventors, as well as aspects of the description that may not otherwise qualify as prior art at the time of filing, are neither expressly nor impliedly admitted as prior art.

Agricultural bins are used for a variety of uses. One such use includes the storage of a particulate material, such as feed for livestock. Still other particulates can be stored and delivered, including but not limited to, grains, additives, medications, or the like. The bin includes a storage portion that can be connected to an outlet. The outlet can be fed, such as via gravity, to allow the particulate material to be delivered, dispensed, or otherwise transferred at the outlet.

There is need to monitor the volume or level of product in a bin. For example, a farmer or other user may need to have up to date numbers to know how much grain is left, such as to be able to provide ample time to order and receive additional product. Being late to notice a low supply of grain or other product in the bin can result in delayed feedings, extra costs, and/or other undesirable interruptions in the operation of the farm or business.

Existing technologies exist for mounting cameras that can be used to monitor the volume of grain or other granular product in a bin. U.S. Pat. No. 6,986,294 includes such a camera that can be used to monitor. U.S. Patent Publication No. 2022/0026258 also includes a sensor that is mounted to a part of the bin.

However, both of the cited references include mounting that is less than ideal. The '294 patent discloses a simple mounting plate that is fixed to the bin. As shown in the figures of the '294 patent, the sensor is mounted on an angled portion of the sloped bin ceiling. This would require the need to account for the angled views from the sensor, which adds difficulty to any software or controls to make sure that an accurate amount of volume is determined with the sensor.

Likewise, the '258 publication includes a bracket that is less than ideal. The sensor is hung from a bracket that is attached to an opening, such as an opening for receiving an amount of grain. However, the bracket includes multiple bends and/or angles to ensure that the sensor is not in line with the opening. This is so that the sensor is not in the way during loading of the bin via the opening. However, the addition of bends and/or angles can weaken the structure of the bracket, and as the sensor is still at least partially within the opening, the sensor could be damaged during loading of the bin from the product being added. In addition, the hanging of the sensor below the bin roof can cause problems and can create additional issues with programming.

Still other solutions require a hole to be drilled in the top of the bin on an angled portion of the rough. This is expensive, creates a leak path, and requires tools to be taken to the top of the bin.

Thus, there exists a need in the art for systems, methods, and/or apparatus that mount sensors and sensor housing to a bin used to store granular product, such as grain, that improves on the issues in the art.

SUMMARY

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present disclosure to improve on or overcome the deficiencies in the art.

It is a further object, feature, and/or advantage of at least some of the aspects and/or embodiments disclosed to eliminate the need for a hanging bracket used to mount a sensor to a bin or other structure.

It is another object, feature, and/or advantage of at least some of the aspects and/or embodiments to provide a mount for a sensor that is low profile and easy to use.

It is yet another object, feature, and/or advantage of at least some of the aspects and/or embodiments to mount a sensor directly to a lid of a bin. A camera module and solar panel could become an integral part of the lid, or a hole could be drilled in the lid, or the camera could be mounted to the underside of the lid.

It is still another object, feature, and/or advantage of at least some of the aspects and/or embodiments to include an accelerometer with a camera or sensor. Such a solution could detect if the lid is opened or closed and notify when the lid is unintentionally left open.

The accelerometer can also act as trigger mechanism for taking a reading as opposed to reading on a fixed time interval, thus enabling real-time notification of feed delivery.

It is still another object, feature, and/or advantage of any of the aspects and/or embodiments to include a sensor/camera housing that protects the sensor from damage. The housing and clips can create a chase for routing wires from the camera module to a power and transmitter module that is located outside of the bin, typically mounted on the roof.

The apparatus disclosed herein can be used in a wide variety of applications. For example, using a clip with a housing of a sensor can allow the sensor to be quickly and easily attached to bins or other storage structures of any design.

It is preferred the apparatus be safe, cost effective, and durable. For example, it is envisioned that any of the aspects and/or embodiments provided be metallic or made of plastic.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the apparatus.

Methods can be practiced which facilitate use, manufacture, assembly, maintenance, and repair of an apparatus which accomplish some or all of the previously stated objectives.

The apparatus can be incorporated into systems or kits which accomplish some or all of the previously stated objectives.

According to some aspects of the present disclosure, a mount is included that is used to mount a sensor module near the top of a storage structure, such as a grain or feed bin.

According to some additional aspects of the present disclosure, the mount includes a housing that is directly connected to the bin, such as via a clip. The housing can be made of metal or plastic. Spring clips are used to secure the housing to the lip. The spring clips are low profile and allow the lid to easily close, which is a required function.

According to at least some aspects of some embodiments, the design of the housing and clips can create a chase for routing wires from the camera module to a power and transmitter module that is located outside of the bin, typically mounted on the roof.

According to still additional aspects of the invention, the mounting of the sensor module is moved to the lid of the grain or feed bin. The camera module and solar panel could become an integral part of the lid, or a hole could be drilled in the lid, or the camera could be mounted to the underside of the lid. Attaching the camera directly to the lid, either using adhesive material or fasteners is the best solution, because it does not require alteration of the lid.

According to at least some aspects of the present disclosure, a bin monitoring system comprises a sensor housing comprising a downwardly sloped portion extending into a portion of a bin; a sensor module positioned at least partially within the sensor housing, said sensor module comprising an optical sensor and a circuit board; and a mount for attaching the sensor housing to the bin, said mount comprising a clip configured to be attached to a portion of the lip or rim of a bin opening.

According to at least some aspects of some embodiments of the present disclosure, the clip comprises a spring clip.

According to at least some aspects of some embodiments of the present disclosure, the sensor housing comprises a substantially vertical back wall and the downwardly sloped portion extending therefrom.

According to at least some aspects of some embodiments of the present disclosure, the clip comprises a plurality of spring clips positioned at the substantially vertical portion of the sensor housing.

According to at least some aspects of some embodiments of the present disclosure, the sensor housing comprises a chase for routing wires from the sensor module to a power source and a transmitter positioned external of the bin.

According to at least some aspects of some embodiments of the present disclosure, the sensor housing and the sensor module comprise an integrated unit.

According to at least some aspects of some embodiments of the present disclosure, the system further comprises a rotatable wiper operatively connected to the sensor module.

According to at least some aspects of some embodiments of the present disclosure, the rotatable wiper comprises a wiper arm and a motor, wherein the motor rotates the wiper arm relative to the optical sensor.

According to at least some aspects of some embodiments of the present disclosure, the motor comprises a servo motor.

According to at least some aspects of some embodiments of the present disclosure, the system further comprises a supplemental retaining member positioned on sensor housing to aid in holding the sensor housing in place relative to the bin opening.

According to at least some aspects of some embodiments of the present disclosure, the supplemental retaining member comprises an adhesive or a magnet.

According to additional aspects of the disclosure, a bin monitoring system for mounting to a lid of a bin comprises a sensor housing comprising; a sensor module positioned at least partially within the sensor housing, said sensor module comprising an optical sensor and a circuit board; wherein said sensor housing is directly coupled to an underside of the lid of the bin.

According to at least some aspects of some embodiments of the present disclosure, the sensor housing is coupled to the underside of the lid of the bin with a mechanical fastener; an adhesive; or a magnet.

According to at least some aspects of some embodiments of the present disclosure, the sensor module further comprises an accelerometer.

According to at least some aspects of some embodiments of the present disclosure, the system further comprises a solar panel on the upper side of the lid, said solar panel electronically connected to the sensor module to provide power thereto.

According to additional aspects of the disclosure, a bin monitoring system comprises a sensor housing comprising a downwardly sloped portion extending into a portion of a bin; a sensor module positioned at least partially within the sensor housing, said sensor module comprising an optical sensor and a circuit board; a mount for attaching the sensor housing to the bin, said mount comprising a clip configured to be attached to a portion of the lip or rim of a bin opening; and a rotatable wiper operatively connected to the sensor module.

According to at least some aspects of some embodiments of the present disclosure, the rotatable wiper comprises a wiper arm and a motor, wherein the motor rotates the wiper arm relative to the optical sensor.

According to at least some aspects of some embodiments of the present disclosure, the motor comprises a servo motor.

According to at least some aspects of some embodiments of the present disclosure, the system further comprises one or more members extending downward from the rotatable wiper.

According to at least some aspects of some embodiments of the present disclosure, the clip comprises a spring clip.

These and/or other objects, features, advantages, aspects, and/or embodiments will become apparent to those skilled in the art after reviewing the following brief and detailed descriptions of the drawings. The present disclosure encompasses (a) combinations of disclosed aspects and/or embodiments and/or (b) reasonable modifications not shown or described.

BRIEF DESCRIPTION OF THE DRAWINGS

Several embodiments in which the present disclosure can be practiced are illustrated and described in detail, wherein like reference characters represent like components throughout the several views. The drawings are presented for exemplary purposes and may not be to scale unless otherwise indicated.

Figure 1:
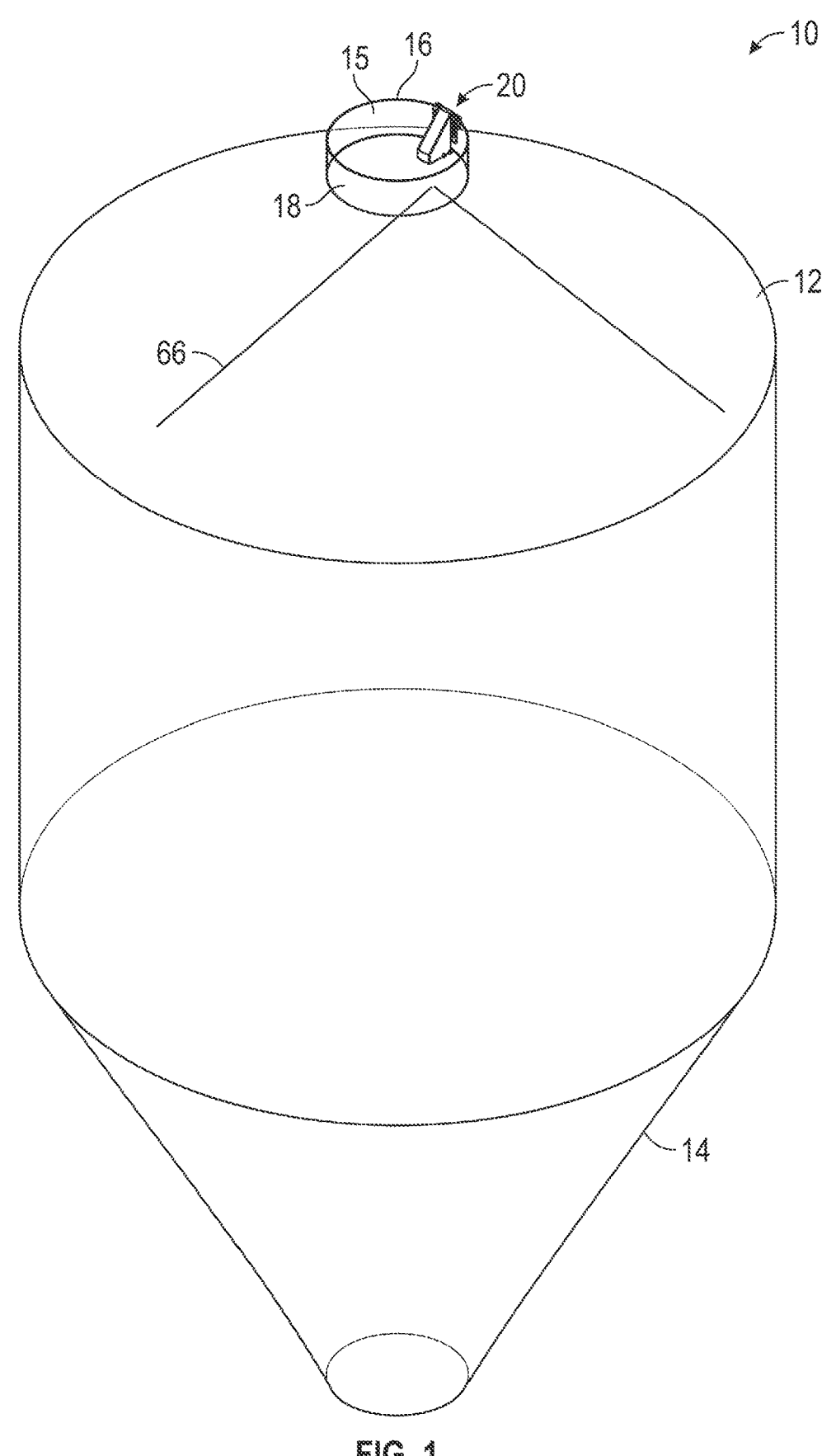
FIG. 1 is a perspective view of a bin including a bin monitoring system according to aspects and/or embodiments of the present disclosure.

An artisan of ordinary skill in the art need not view, within isolated figure(s), the near infinite distinct combinations of features described in the following detailed description to facilitate an understanding of the present disclosure.

DETAILED DESCRIPTION

Unless defined otherwise, all technical and scientific terms used above have the same meaning as commonly understood by one of ordinary skill in the art to which embodiments of the present disclosure pertain.

The terms "a," "an," and "the" include both singular and plural referents.

The term "or" is synonymous with "and/or" and means any one member or combination of members of a particular list.

As used herein, the term "exemplary" refers to an example, an instance, or an illustration, and does not indicate a most preferred embodiment unless otherwise stated.

The term "about" as used herein refers to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variables, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

The terms "bin", including "grain bin" and/or "feed bin", "storage structure", "structure", and the like are to be considered interchangeable and non-limiting in that they define a physical structure that is able to receive and store a granular product, such as feed or grain.

Screws, nuts, bolts, pins, rivets, staples, washers, grommets, latches (including pawls), ratchets, clamps, clasps, flanges, ties, adhesives, welds, any other known fastening mechanisms, or any combination thereof may be used to facilitate fastening.

The present disclosure is not to be limited to that described herein. Mechanical, electrical, chemical, procedural, and/or other changes can be made without departing from the spirit and scope of the present disclosure. No features shown or described are essential to permit basic operation of the present disclosure unless otherwise indicated.

Figure 2:
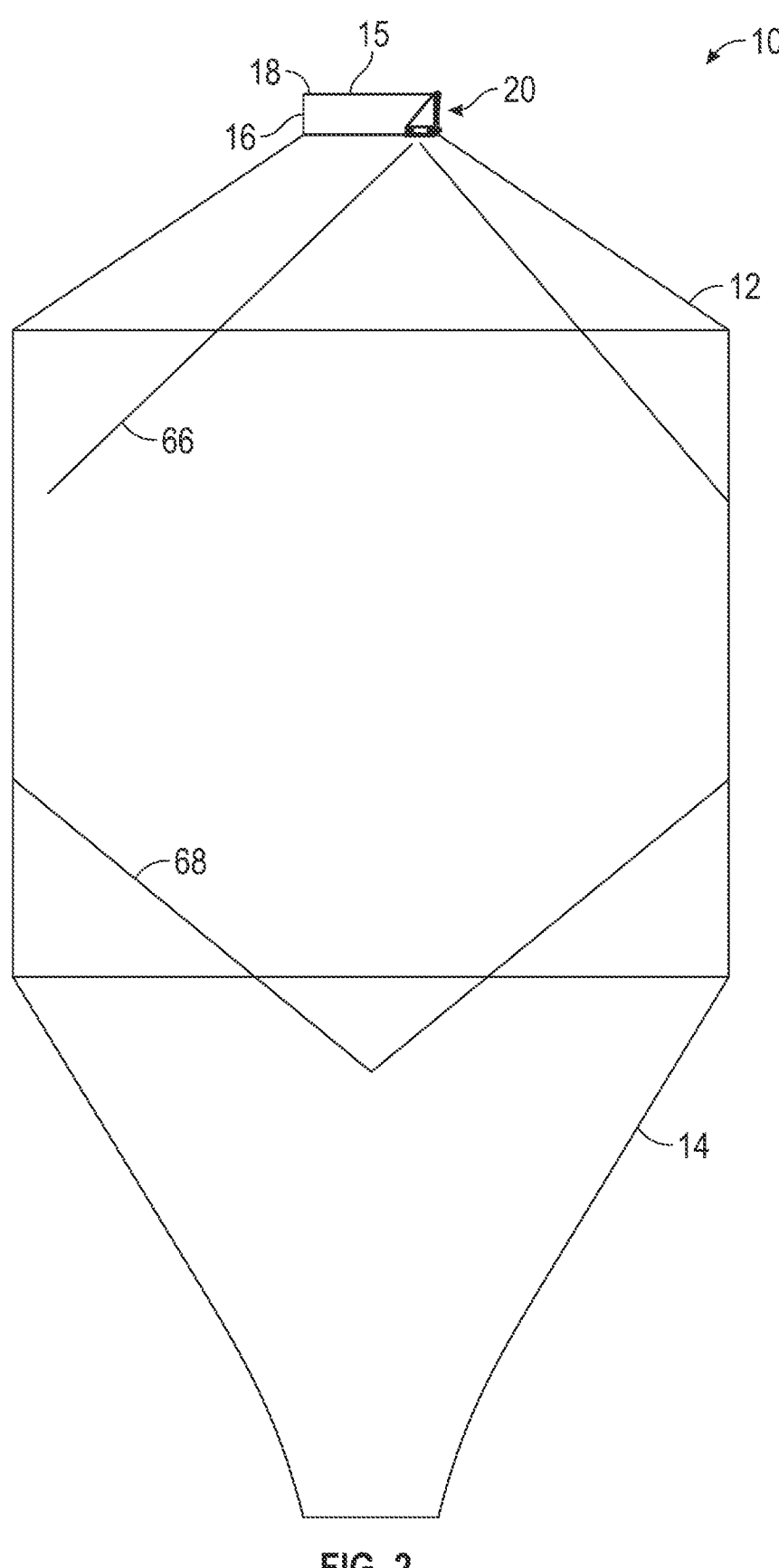
FIG. 2 is a side sectional view of the bin and bin monitoring system of FIG. 1.
Figure 3:
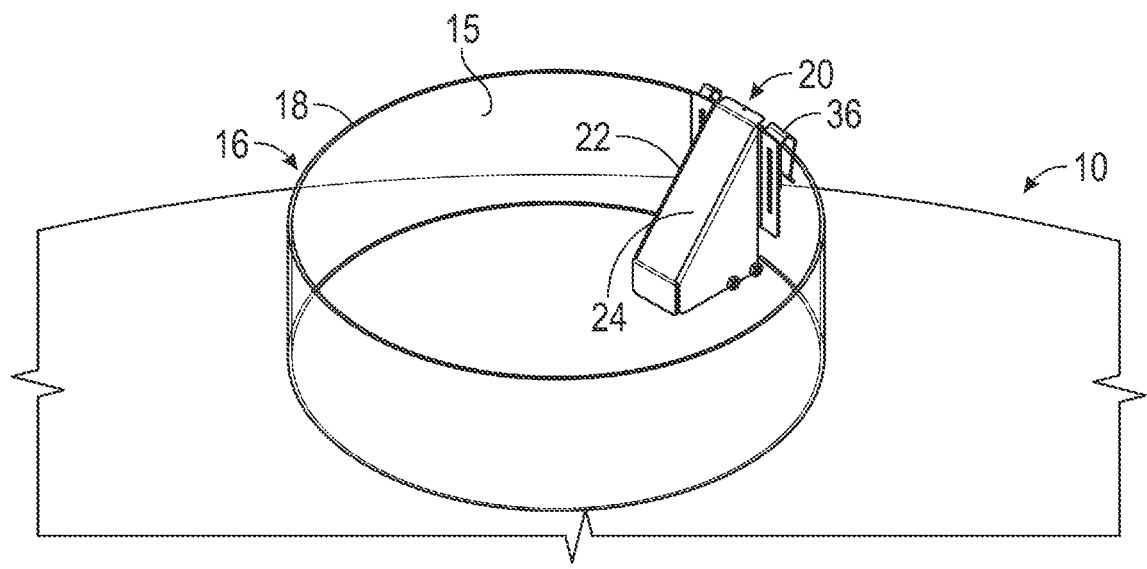
FIG. 3 is an enlarged perspective view of a bin monitoring system mounted to a portion of a bin according to aspects and/or embodiments of the present disclosure.
Figure 4:
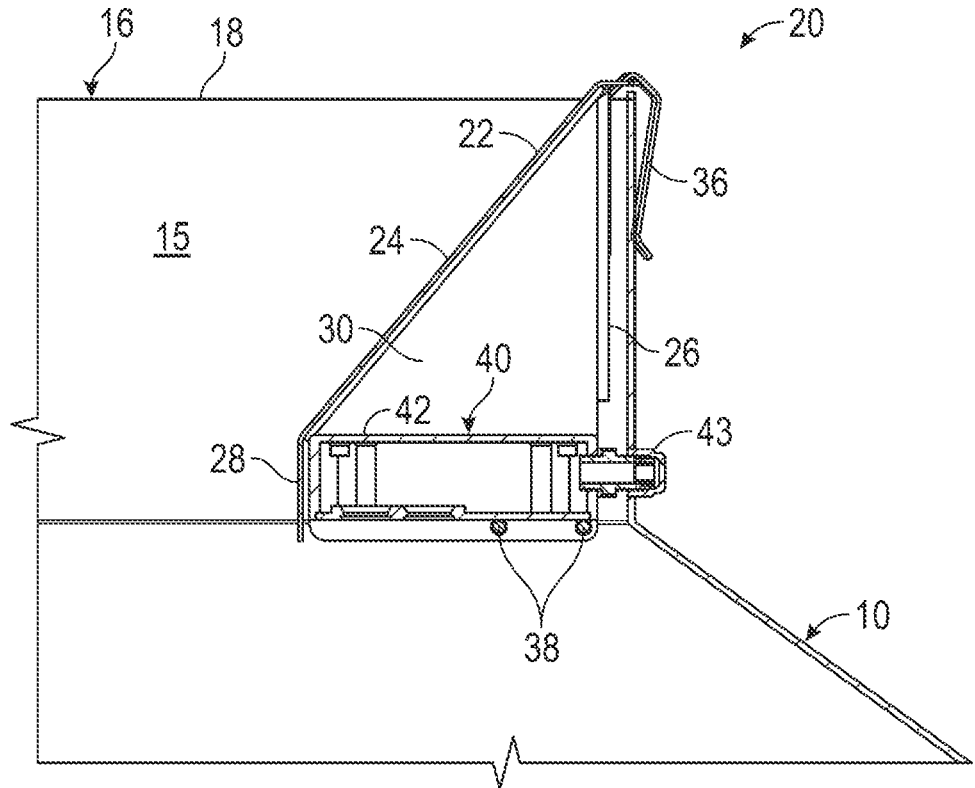
FIG. 4 is a side sectional view of FIG. 3.
Figure 5:
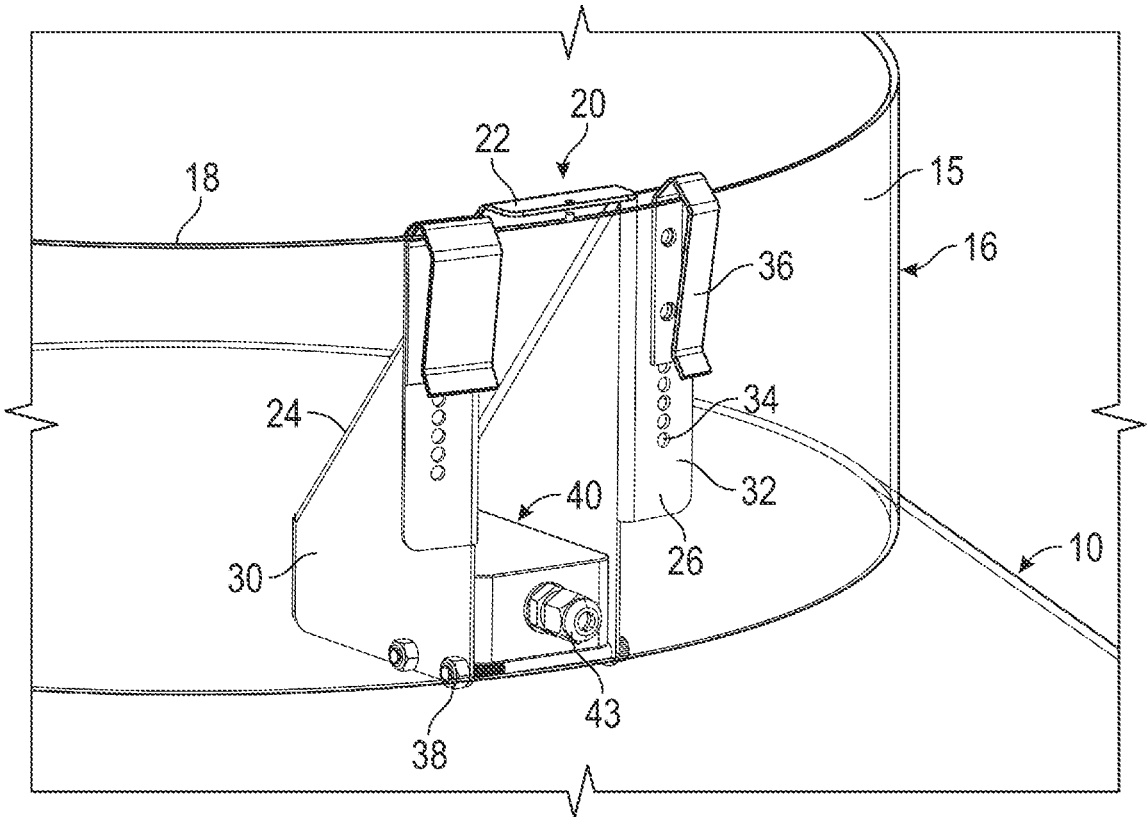
FIG. 5 is a rear perspective view of the bin monitoring system of FIG. 3.
Figure 6:
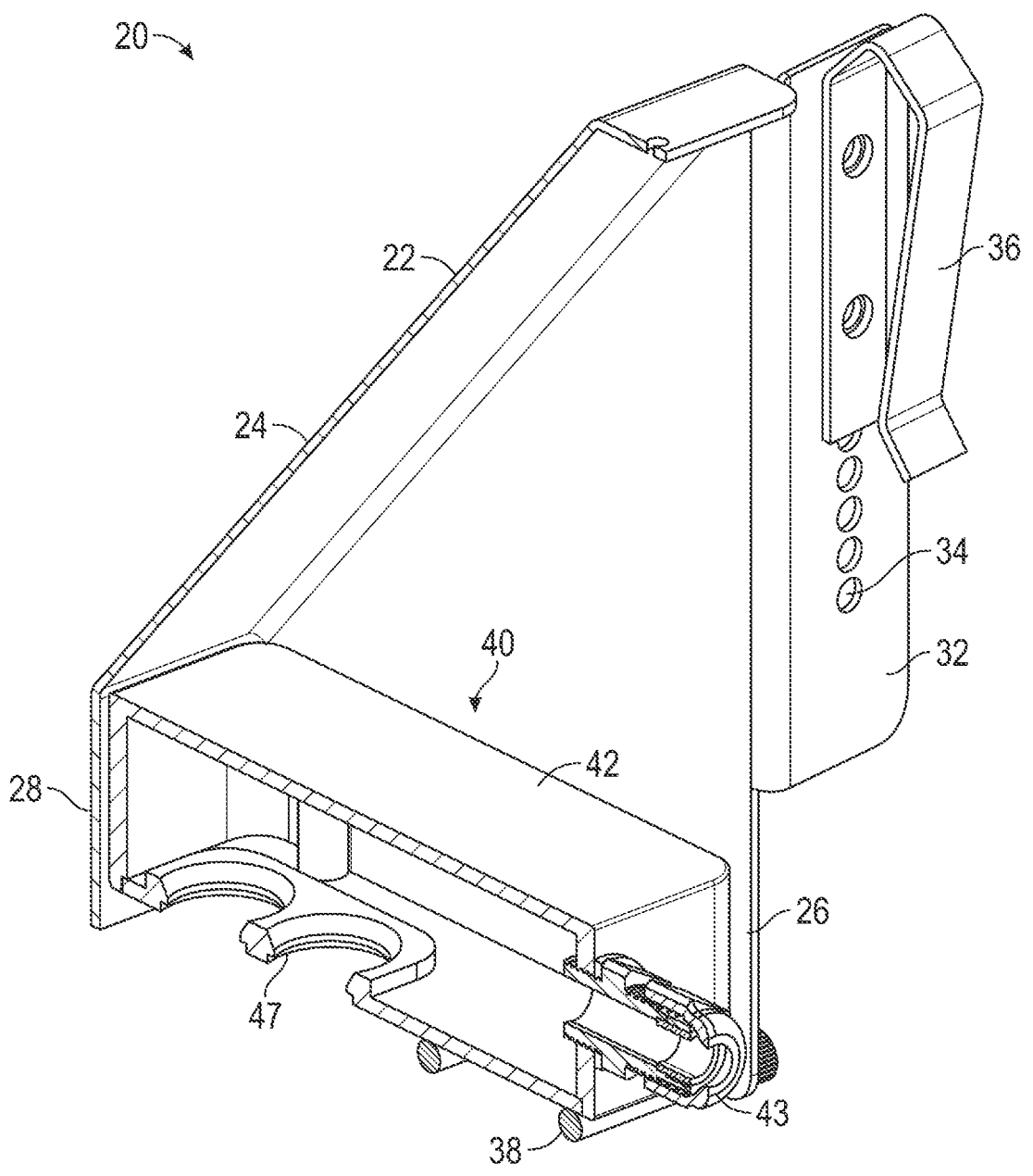
FIG. 6 is a perspective sectional view of the bin monitoring system of FIG. 3.
Figure 7:
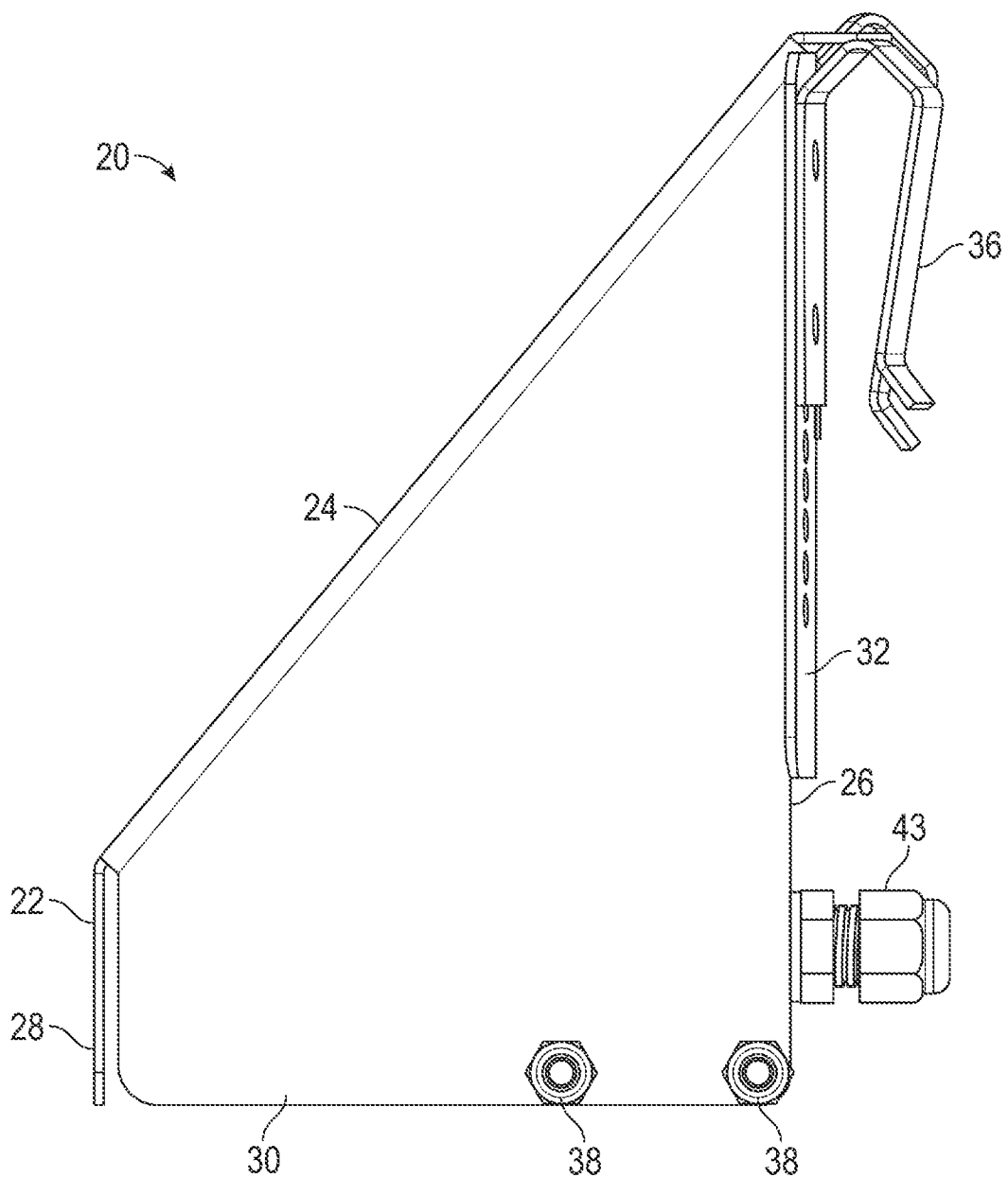
FIG. 7 is a side elevation view of the bin monitoring system of FIG. 3.

FIGS. 1 and 2 depict a typical particular material storage structure 10, which may be referred to as a grain bin, feed bin, bin, silo, or other storage device. The grain bin 10 shown in the figures is for illustrative purposes to show aspects and/or embodiments of bin monitoring systems 20, 120, 170 as will be provided herein. The feed bin 10 may be of the sort described in U.S. patent application Ser. No. 17/448,095, which is hereby incorporated by reference in its entirety. For purposes of the present application, the bin 10 includes an upper end 12 and a lower end 14. At or near the upper end 12 is a lid 16, which includes an opening 15 and a rim 18. The lid 16 and opening is used as a location for adding additional particular materials, such as grain or other feed to an interior of the bin.

The lower end 14 of the feed bin 10 is used to move the grain or feed from within the bin towards an end use, such as feeding livestock. Thus, in a typical bin, the material is added via the opening in the top and emptied from the bottom, with the volume within the bin ever-changing.

Having an idea of the volumetric amount in the bin 10 is necessary, such as to make sure that there is enough feed or grain to feed the livestock, and to know when to refill the bin for future uses. However, as shown exemplary in FIG. 2, the grain level 68 is not always even or level. That coupled with different shapes and sizes for bins, makes it difficult to calculate or otherwise assess the remaining volume of grain in the bin.

Therefore, aspects and/or embodiments of the present disclosure include a bin monitoring system 20, 120, 170 that is an improvement over known systems in order to best mount a system for monitoring and determining volume of material remaining in a bin at any given time, including an up-to-date amount in real time.

In general, the bin monitoring system 20, such as that shown in FIGS. 1-9, includes a housing 22 with a sensor, such as an optical sensor (e.g., a camera) positioned therein. The housing 22 is mounted to a portion of the bin 10. One improvement of the present disclosure includes the way the housing 22 is mounted to the bin 10, as will be discussed. In summary, the mounting is at the lid 16 of the bin, providing a better location for calculating the volume in the bin. As shown in FIG. 2, the optical sensor 54 includes a viewing area 66 from its mounted location, which will provide the needed information to calculate the amount of material in the bin 10, regardless of the levelness of the material.

As shown best in FIGS. 3-9, according to at least some aspects of some embodiments, the bin monitoring system 20 is mounted at the lid 16 of the bin 20 and within the opening thereof. Such a location will provide numerous advantages, such as providing the best location for calculating the volume from a more centralized location. As will be further understood, the mounting of the system 20 to the bin 10 will be done without needing to drill or bolt the system 20 to the bin, which eliminates the need to add any holes to the bin.

The bin monitoring system 20 shown in FIGS. 3-9 includes a housing 22. The housing 22 comprises metal, such as steel, stainless steel, or similar metallic compositions capable of withstanding the elements and interactions with the grain being added to the bin 10. The housing 22 includes a downward sloped portion 24, which is sloped towards the interior of the opening 15 of the lid 16. As the system 20 is positioned in the lid at the location where additional grain will be added, the sloped portion 24 will aid in the filling of the bin 10 by ensuring that grain that interacts with the housing will be directed towards the center of the opening 15, and thus, the center area of the bin itself. The housing 22 also includes a substantially vertical rear portion 26, which is part of flanged portions 32. The flanged portions 32 include a plurality of holes 34. The housing 22 further includes a front vertical portion 38 and sides 30, which provide cover for the optical sensor positioned within the housing 22.

As noted, a sensor, such as an optical sensor (e.g., a camera) is used with the system 20. It should be appreciated that the sensor itself take many forms. The sensors may include vision sensors, radar sensors, LIDAR sensors, time-of-flight (ToF) sensors, or the like, which can be used to provide information to acquire the volume of the grain in the bin.

The figures show that the sensor 54 is positioned in a sensor module 40. The sensor module 40 includes a module housing 42 that is positioned generally under the sloped portion 24 and between the sides 30. As shown best in FIG. 5, the rear of the system housing 22 is generally open between the flanges 32. The sensor module 40 is positioned therein with access at a rear for a cable connection, such as by a harness 43. Underneath the module housing 42 are a plurality of bolts 38 extending from one side 30 to the other to hold the module housing 42 in place. The housing can house the camera module, thus protecting it from damage by feed, or the unloading auger.

One aspect of the disclosure is the manner in which the bin monitoring housing 22 is mounted to the bin at the lid 16. The figures show the use of clips 36 connected to the housing 22, such as via mechanical connections at the holes 34 of the flange portions 32 of the housing 22. The clips 36 could also be connected via adhesives to the housing 22. The clips 36 comprise spring clips that will provide a sort of clamping force on opposite sides of the lid lip and to secure the housing the lip. The spring clips are low profile and allow the lid to easily close, which is a required function. The figures show two clips used, but one or more than two could be used, depending on the size of the housing and the desired hold by the clips.

Additional aspects include the use of rivets to attach the clips 36 to the housing 22.

The rivets can be attached to the housing and the clips attached to the rivets.

Still further, the housing could include an additional magnet (or tape, adhesive, etc.) to the base of the clip on the housing to secure it more fully if necessary. For example, the two clips could hold the upper portion of the housing relative to the bin, and the third element (i.e., the magnet, tape, adhesive, etc.) could hold a lower portion of the housing to the bin. This would ensure the housing is pressed against the bin rim firmly and to hold the housing, and thus, the sensor, in a vertical position.

Figure 8:
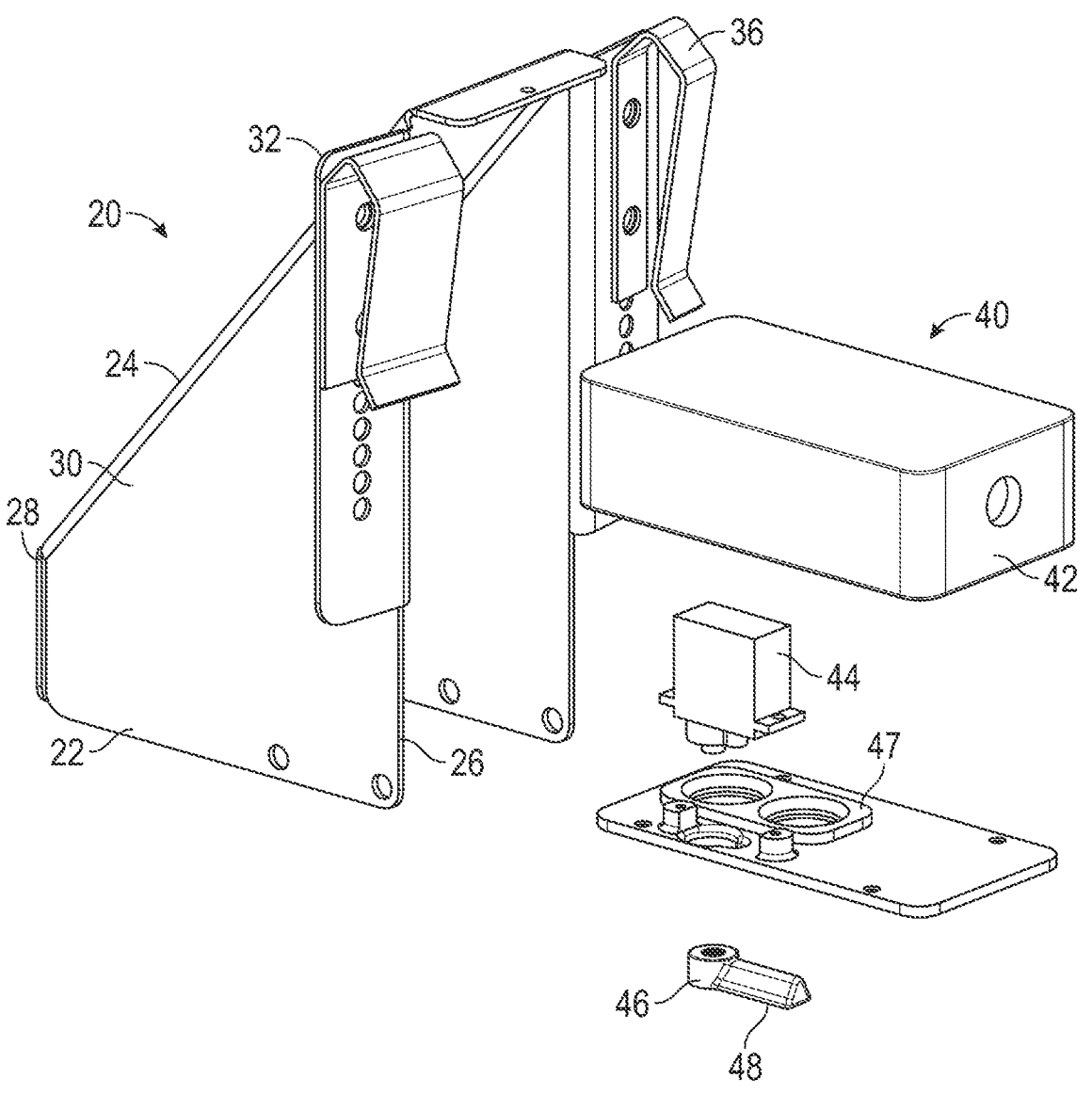
FIG. 8 is an exploded view of the bin monitoring system of FIG. 3.

FIG. 8 shows the bin monitoring system 20 in an exploded manner. The housing 42 includes a top cover and a lower base. The top cover includes an aperture at the rear for cables and the harness to pass. The top cover mitigates exposure of the interior to debris, such as dust, grain, or the like, which could damage or otherwise interfere with the electronics housed therein. Housed in the module housing 42, in addition to the optical sensor, circuit board (such as a printed circuit board), is a servo motor 44 and associated servo horn 46. The servo motor 44 has an output shaft extending through an aperture in the lower base of the module housing 42 and in connection with the servo horn 46. Connected to or integral with the horn 46 can be a wiper 48. The wiper 48 can be rotated via the servo motor to contact the sensor 54 that may be extending through or otherwise exposed through sensor apertures 47 in the lower base. As the sensor may be exposed to the bin, dust and other debris may become positioned on the sensor, which can affect the operation and accuracy of the sensor. The wiper 48 can be used to cleanse or wipe off the sensor 54 from time to time, ensuring the highest possible quality of measurements and calculations via the system 20.

While an optical sensor 54 is not shown in FIGS. 3-9, the sensor would be positioned adjacent the apertures 47 to view the interior of the bin and to acquire the information needed to calculate the volume of material therein.

Additional features of the system not necessarily shown in the figures include a power supply for the components of the sensor module 40. The power supply outputs a particular voltage to a device or component or components of a device. The power supply could be a direct current ("DC") power supply (e.g., a battery), an alternating current ("AC") power supply, a linear regulator, etc. The power supply can be configured with a microcontroller to receive power from other grid-independent power sources, such as a generator or solar panel.

With respect to batteries, a dry cell battery may be used. Additionally, the battery may be rechargeable, such as a lead-acid battery, a low self-discharge nickel metal hydride battery ("LSD-NiMH") battery, a nickel-cadmium battery ("NiCd"), a lithium-ion battery, or a lithium-ion polymer ("LiPo") battery. Careful attention should be taken if using a lithium-ion battery or a LiPo battery to avoid the risk of unexpected ignition from the heat generated by the battery. While such incidents are rare, they can be minimized via appropriate design, installation, procedures and layers of safeguards such that the risk is acceptable.

According to at least some aspects of some embodiments, any of the bin monitoring systems can utilize a LiFePO4 battery. The lithium iron phosphate battery (LFP (lithium ferro-phosphate), or Li-IP) is a type of lithium-ion battery using lithium iron phosphate (LiFePO4) as the cathode material, and a graphitic carbon electrode with a metallic backing as the anode.

The power supply could also be driven by a power generating system, such as a dynamo using a commutator or through electromagnetic induction. Electromagnetic induction eliminates the need for batteries or dynamo systems but requires a magnet to be placed on a moving component of the system.

The power supply may also include an emergency stop feature, also known as a "kill switch," to shut off the machinery in an emergency or any other safety mechanisms known to prevent injury to users of the machine. The emergency stop feature or other safety mechanisms may need user input or may use automatic sensors to detect and determine when to take a specific course of action for safety purposes.

In addition, a transmitter and/or transmitting system may be included in the sensor module 40 or operatively connected thereto, such as at a location on the outside of the bin. The transmitter is connected to the PCB 52 to retrieve the data acquired by the sensor and to transmit the same for calculation. The PCB 52 may be or include a processing unit. In addition, the PCB 52 may simply be connected to a processing unit. A processing unit, also called a processor, is an electronic circuit which performs operations on some external data source, usually memory or some other data stream. Non-limiting examples of processors include a microprocessor, a microcontroller, an arithmetic logic unit ("ALU"), and most notably, a central processing unit ("CPU"). A CPU, also called a central processor or main processor, is the electronic circuitry within a computer that carries out the instructions of a computer program by performing the basic arithmetic, logic, controlling, and input/output ("I/O") operations specified by the instructions. Processing units are common in tablets, telephones, handheld devices, laptops, user displays, smart devices (TV, speaker, watch, etc.), and other computing devices.

The transmitter may include wired or wireless network. In some embodiments, the network is, by way of example only, a wide area network ("WAN") such as a TCP/IP based network or a cellular network, a local area network ("LAN"), a neighborhood area network ("NAN"), a home area network ("HAN"), or a personal area network ("PAN") employing any of a variety of communication protocols, such as Wi-Fi, Bluetooth, ZigBee, near field communication ("NFC"), etc., although other types of networks are possible and are contemplated herein. The network typically allows communication between the communications module and the central location during moments of low-quality connections.

Communications through the network can be protected using one or more encryption techniques, such as those techniques provided by the Advanced Encryption Standard (AES), which superseded the Data Encryption Standard (DES), the IEEE 802.1 standard for port-based network security, pre-shared key, Extensible Authentication Protocol ("EAP"), Wired Equivalent Privacy ("WEP"), Temporal Key Integrity Protocol ("TKIP"), Wi-Fi Protected Access ("WPA"), and the like.

As will be noted herein, the transmitter could also comprise LoRa. LoRa (from "long range") is a physical proprietary radio communication technique. LoRaWAN defines the communication protocol and system architecture. LoRaWAN is an official ITU-T Y.4480 standard of the International Telecommunication Union (ITU).

Together, LoRa and LoRaWAN define a Low Power, Wide Area (LPWA) networking protocol designed to wirelessly connect battery operated devices to the internet in regional, national or global networks, and targets key Internet of things (IoT) requirements such as bi-directional communication, end-to-end security, mobility and localization services. The low power, low bit rate, and IoT use distinguish this type of network from a wireless WAN that is designed to connect users or businesses, and carry more data, using more power. The LoRaWAN data rate ranges from 0.3 kbit/s to 50 kbit/s per channel.

For wired networks, ISOBUS or Ethernet may be utilized. ISO 11783, known as Tractors and machinery for agriculture and forestry-Serial control and communications data network (commonly referred to as "ISO Bus" or "ISOBUS") is a communication protocol for the agriculture industry based on the SAE J1939 protocol (which includes CANbus). The standard comes in 14 parts: ISO 11783-1: General standard for mobile data communication; ISO 11783-2: Physical layer; ISO 11783-3: Data link layer; ISO 11783-4: Network layer; ISO 11783-5: Network management; ISO 11783-6: Virtual terminal; ISO 11783-7: Implement messages application layer; ISO 11783-8: Power train messages; ISO 11783-9: Tractor ECU; ISO 11783-10: Task controller and management information system data interchange; ISO 11783-11: Mobile data element dictionary; ISO 11783-12: Diagnostics services; ISO 11783-13: File server; ISO 11783-14: Sequence control.

Ethernet is a family of computer networking technologies commonly used in local area networks ("LAN"), metropolitan area networks ("MAN") and wide area networks ("WAN"). Systems communicating over Ethernet divide a stream of data into shorter pieces called frames. Each frame contains source and destination addresses, and error-checking data so that damaged frames can be detected and discarded; most often, higher-layer protocols trigger retransmission of lost frames. As per the OSI model, Ethernet provides services up to and including the data link layer. Ethernet was first standardized under the Institute of Electrical and Electronics Engineers ("IEEE") 802.3 working group/collection of IEEE standards produced by the working group defining the physical layer and data link layer's media access control ("MAC") of wired Ethernet. Ethernet has since been refined to support higher bit rates, a greater number of nodes, and longer link distances, but retains much backward compatibility. Ethernet has industrial application and interworks well with Wi-Fi. The Internet Protocol ("IP") is commonly carried over Ethernet and so it is considered one of the key technologies that make up the Internet.

The information acquired from the sensor may be transmitted to a memory as well. The memory includes, in some embodiments, a program storage area and/or data storage area. The memory can comprise read-only memory ("ROM", an example of non-volatile memory, meaning it does not lose data when it is not connected to a power source) or random access memory ("RAM", an example of volatile memory, meaning it will lose its data when not connected to a power source). Examples of volatile memory include static RAM ("SRAM"), dynamic RAM ("DRAM"), synchronous DRAM ("SDRAM"), etc. Examples of non-volatile memory include electrically erasable programmable read only memory ("EEPROM"), flash memory, hard disks, SD cards, etc. In some embodiments, the processing unit, such as a processor, a microprocessor, or a microcontroller, is connected to the memory and executes software instructions that are capable of being stored in a RAM of the memory (e.g., during execution), a ROM of the memory (e.g., on a generally permanent basis), or another non-transitory computer readable medium such as another memory or a disc.

Figure 9:
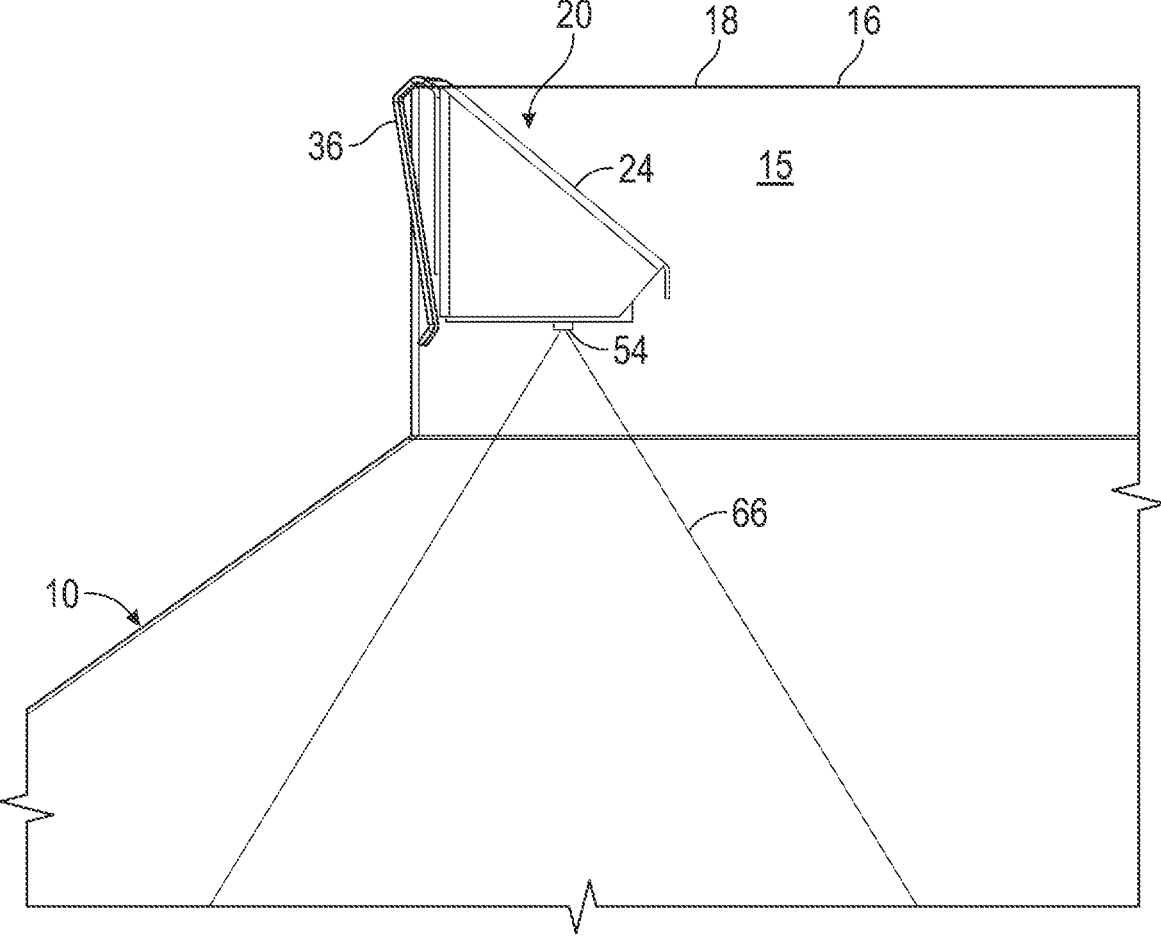
FIG. 9 is a schematic showing operation of the bin monitoring system of FIG. 3.

Therefore, as shown in FIG. 9, the bin monitoring system 20 is positioned at the lid 16 of the bin 10 in a manner that provides an ideal viewing area 66 into the bin. This viewing area that is "seen" via the sensor is used to determine the volume of material in the bin 10.

Figure 10:
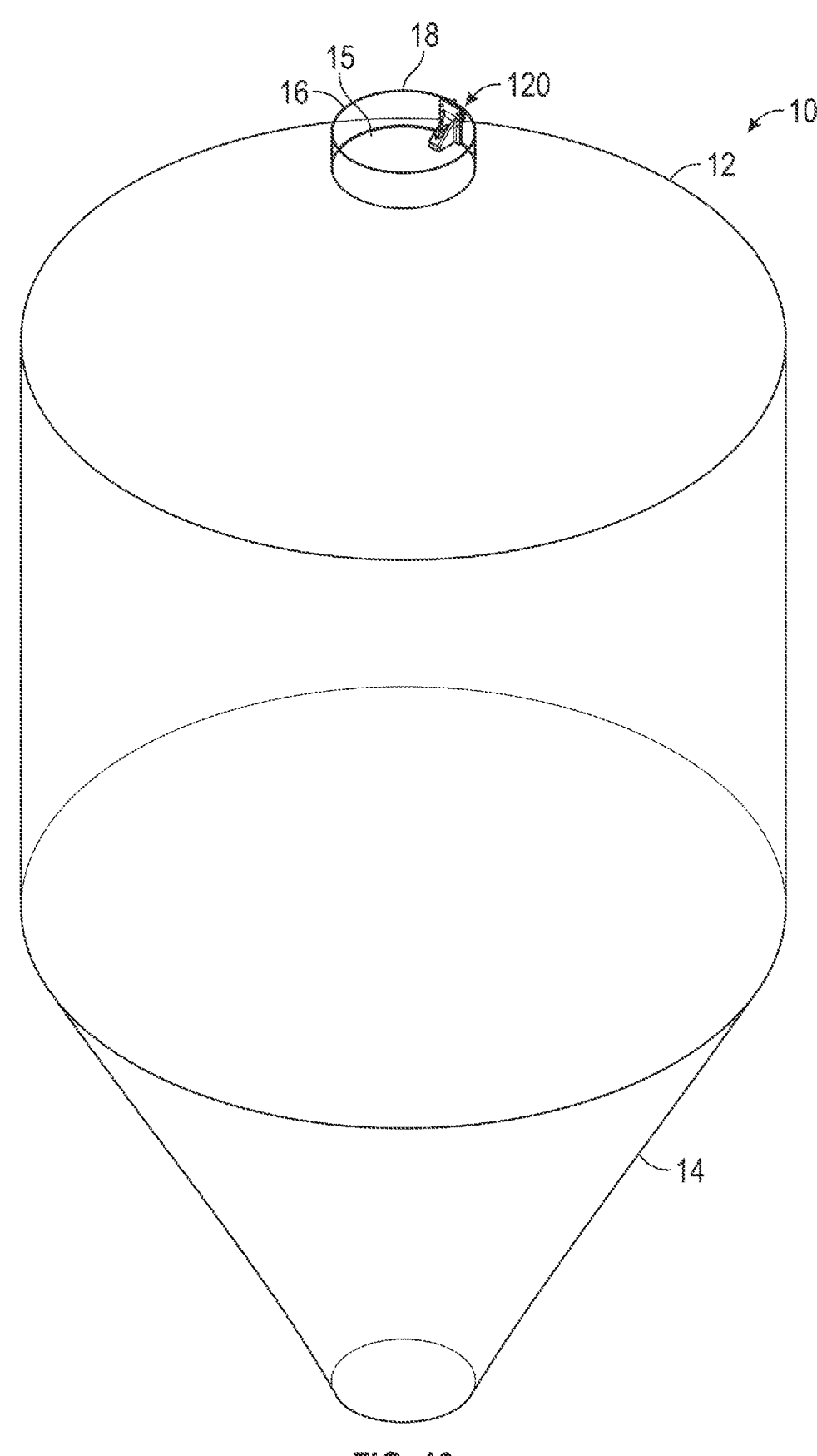
FIG. 10 is a perspective view of a bin including another bin monitoring system according to aspects and/or embodiments of the present disclosure.
Figure 11:
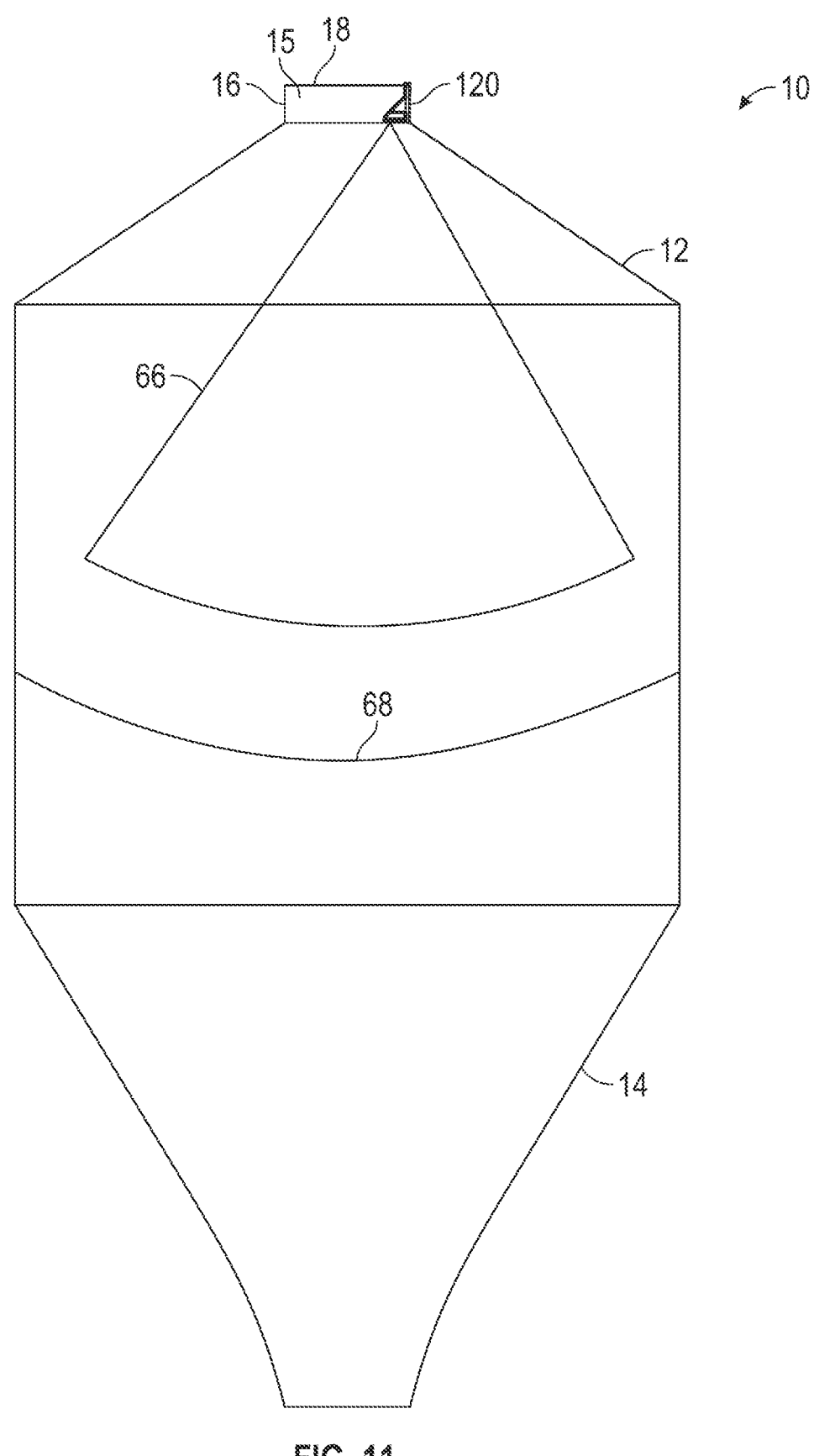
FIG. 11 is a side sectional view of the bin and bin monitoring system of FIG. 10.
Figures 12, 13:
FIG. 12 is an enlarged perspective view of a bin monitoring system mounted to a portion of a bin according to aspects and/or embodiments of the present disclosure.
FIG. 13 is a side sectional view of FIG. 12.
Figure 14:
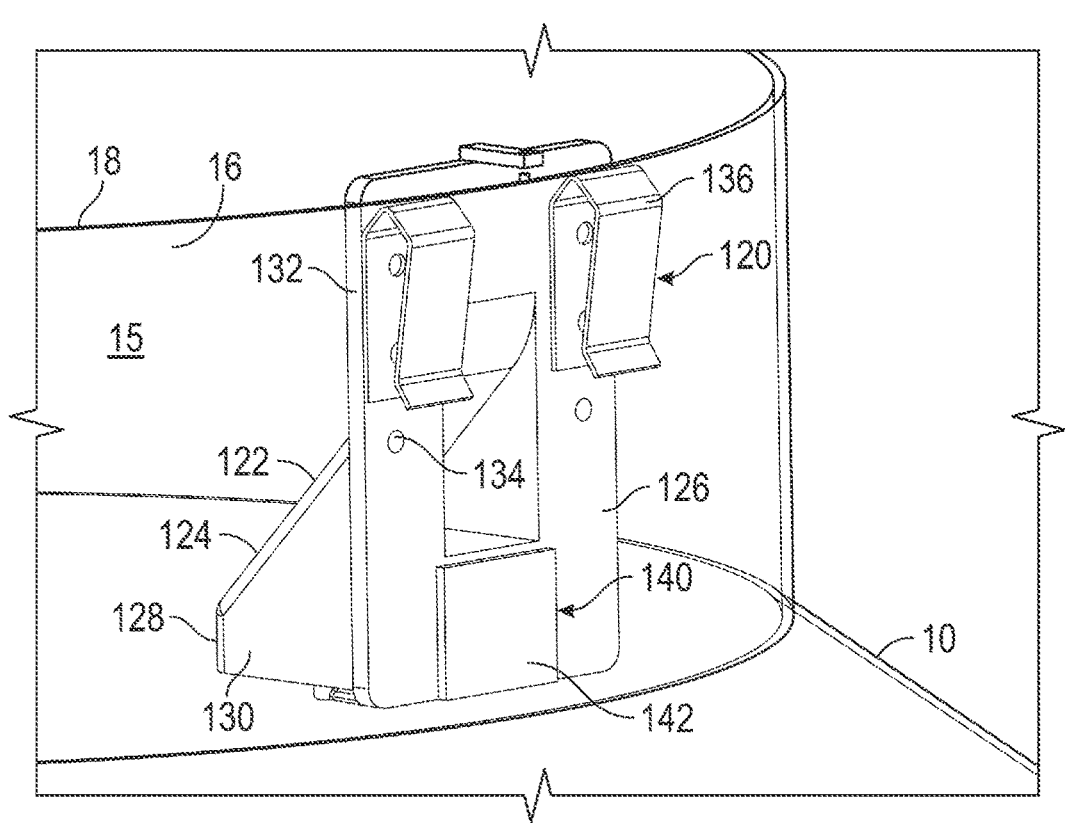
FIG. 14 is a rear perspective view of the bin monitoring system of FIG. 12.

FIGS. 10-16 show additional aspects and/or embodiments of a bin monitoring system 120. As shown in FIGS. 10 and 11, the system 120 can be used with the bin 10 as previously disclosed, including the positioning of the system 120 at the opening of the lid 16 of the bin 10.

In addition, the system 120 includes a housing 122 for housing a sensor module 140. The housing 120 includes a downward sloped portion 124 that is sloped from the lip of the lid 16 towards the center of the opening thereof. The housing further includes a substantially vertical rear portion 126, a front vertical portion 128, and opposite sides 130. However, one difference from the housing 122 and the housing 22 as previously disclosed is that the housing 122 shown in FIGS. 10-16 comprises a plastic, such as a thermoplastic polymer. According to at least some embodiments, the thermoplastic comprises High-density polyethylene (HDPE). However, it should be appreciated that other, rigid types of plastic may be used as well.

The housing 122 further comprises a flange portion 132 with holes 134. As with the previous disclosure, the flange 132 and holes 134 can be used to connect clips 136, such as spring clips, to the housing 122. The clips 136 can then be positioned on the lip of the lid to hold the system 120 in place thereat. In addition, the clips can be attached to the plastic in other manners, including, but not limited to, adhesives, mechanical fasteners, or the like.

Figure 15:
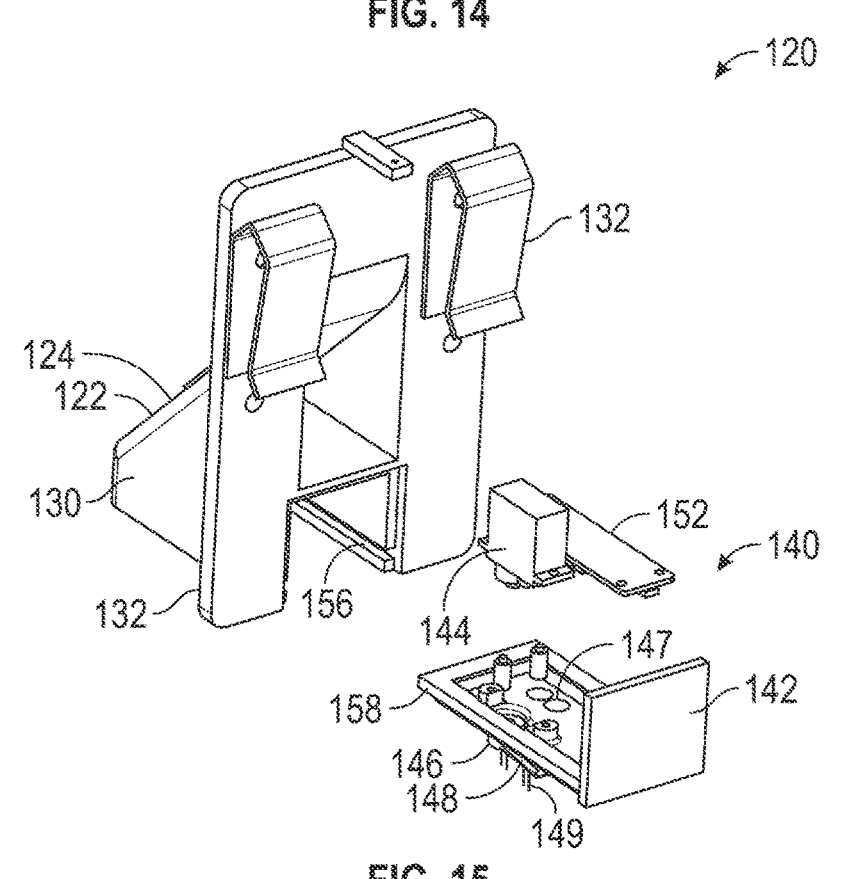
FIG. 15 is an exploded view of the bin monitoring system of FIG. 12.

The plastic housing 122 includes the same advantages as previously disclosed for the metallic housing 22. In addition, the plastic design offers additional advantages in that it integrates the sensor module enclosure and housing into one integrated unit. For example, as shown in FIG. 15, the sensor module 140 includes a housing 142 that includes a base and a rear portion. The base includes a slide tongue 158 that communicates with a slide groove 156 of the system housing 122. Thus, the module housing 142 can be an integral unit that is slid into engagement with the system housing 122 to position and hold the module in place relative to the protective housing 122. The slid in module 140 in engagement with the protective housing 122 is shown from an underside in FIG. 16. An advantage of the plastic version of the housing is that it integrates the sensor enclosure and housing into one integrated unit, thus eliminating parts and joints.

At least one benefit to the sliding engagement for the module housing 142 and the protective housing 122 is that the components may be fit together. The slidable connection between the housings may be established through the use of one or more suitable slidable elements, including: a friction fit on a slip (non-stick) surface, guides, tracks, piston(s), shaft(s), sleeve(s), collar(s), ball bearings, actuator(s), linkage(s), pivot(s), and/or the like. It is preferred that the slidable connection only allow the module housing 142 to slide in one dimension (i.e., linearly) with respect to the protective housing 122. Yet, it is to be appreciated some minor relief in a second dimension can be to mitigate wear, tear, or failure of slidable components and/or elements. To that end, oils, grease, lubricants, antistatic agents, and/or other non-viscous fluids or devices can be applied where wear and tear is expected to further mitigate the same overtime.

Figure 16:
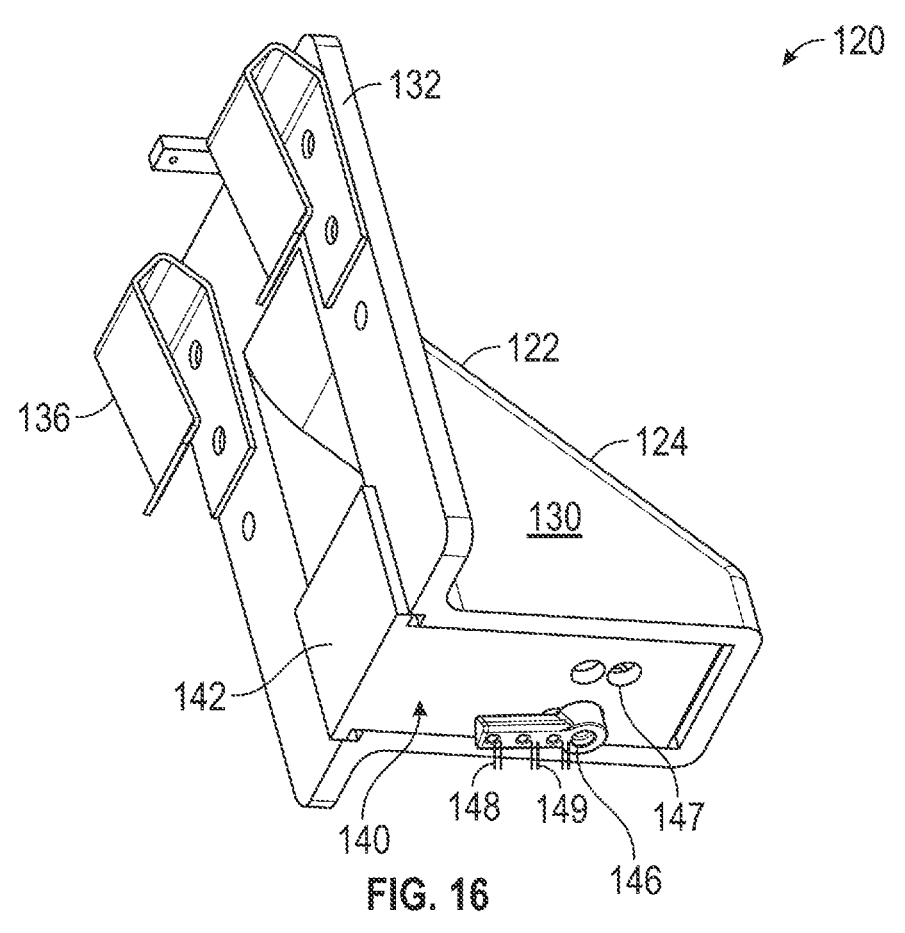
FIG. 16 is a rear, lower perspective of the bin monitoring system of FIG. 12.

The integral sensor module 140 further includes a servo motor 14, servo horn 146, and printed circuit board 152. A transmitter (not shown) may be included as part of the module or may be connected thereto at a remote location away from the system 120. The housing includes apertures 147 for placement of the optical sensor. In addition, a wiper 148 may be part of the horn 146 to clean the sensor. According to some embodiments, such as shown in FIG. 16, members 149 may be added to the underside of the wiper 148. The members 149 may be in the form of whiskers or other protrusions that are spaced from one another and which extend from the wiper. While multiple whiskers 149 are shown, it should be appreciated that a single whisker or multiple whiskers could be included. The whiskers 149 will move with the wiper 148 and will provide further advantages. For example, bugs and/or insects, such as spiders, may reside in a bin and try to make webs or nests, such as at or around the sensor 120. The wiper 148 and whiskers 149 can be used to remove any such webs or nests to ensure that the sensor is able to have clear view of the contents within the bin to provide the information such as amount of material in the bin. The whiskers 149 can be any rigid or semi-rigid material, such as plastics, rubber, metal, or the like.

Therefore, for any version of the system as shown in FIGS. 1-16, a hanging bracket is eliminated, as the systems are clipped directly to the lip of the bin lid. The design of the housing and clips can also create a chase for routing wires from the camera module to a power and transmitter module that is located outside of the bin, typically mounted on the roof.

Figure 17:
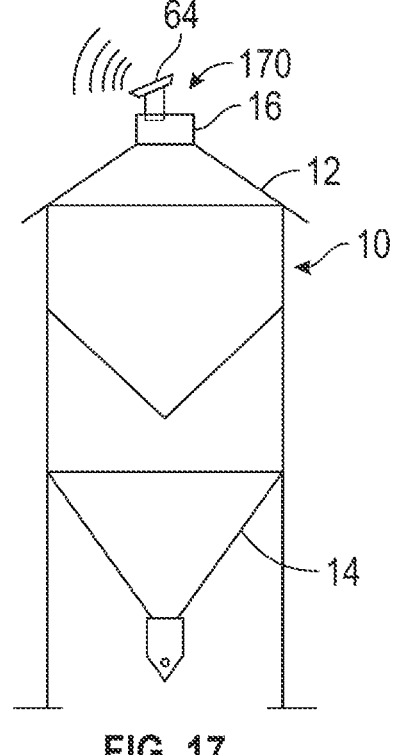
FIG. 17 is an elevation view of a bin and another bin monitoring system according to aspects and/or embodiments of the present disclosure.

Additional aspects and/or embodiments of the disclosure are shown in FIG. 17. FIG. 17 shows another depiction of a bin 10, including the upper portion 12 and lower portion 14. A bin lid 16 with opening 15 is also shown. However, in FIG. 17, instead of using clips to mount the bin monitoring system 170, the system is mounted directly to the lid. In this instance, the lid is an openable and closeable feature connected to the bin. The opening of the bin allows for additional material to be added. The opening also allows for viewing into an interior of the bin. The closing of the lid would protect the interior from ambient conditions, such as weather, rodents, or other unwanted elements that could damage, deteriorate, or otherwise affect the material housed therein.

As shown in the figure, the system 170 includes a camera/sensor module connected to a solar panel. The sensor module could be similar to those included herein, and including a sensor, PCB, transmitter, power source, connections, and/or other elements. The solar panel can be used with any of the embodiments disclosed herein to provide power to the components of the systems. The camera module and solar panel could become an integral part of the lid, or a hole could be drilled in the lid or the camera could be mounted to the underside of the lid. Attaching the camera directly to the lid, either using adhesive material or fasteners is the best solution, because it does not require alteration of the lid. In addition, the solar panel could be rotatable, such as via a rotatable tower, which would best position the panel towards the sun.

In addition to easier mounting, there are additional benefits to affixing the camera to the lid. For example, in such a situation, the system 170 could also include an accelerometer, such as part of the PCB in the sensor module. By including an accelerometer within the camera module, this solution could detect if the lid is opened or closed and notify when the lid is unintentionally left open. The accelerometer can also act as trigger mechanism for taking a reading as opposed to reading on a fixed time interval, thus enabling real-time notification of feed delivery.

Figure 18:
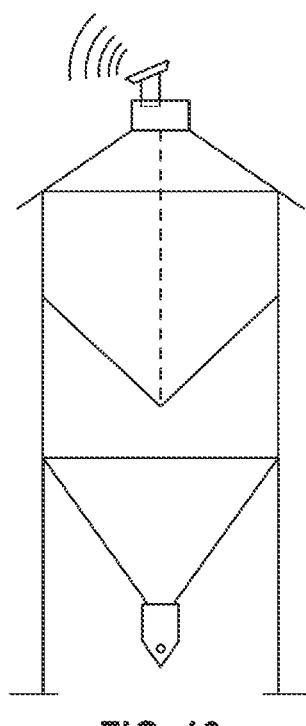
FIG. 18 is a schematic showing additional aspects of the system shown in any of the figures showing a bin monitoring system.

Additional elements and/or advantages of the integral sensor module directly coupled to the lid are shown in FIG. 18. For example, the sensor module could be outfitted with a transmitter, such as those capable of communicating via any of the protocols disclosed herein. This could further include LoRa. LoRa (from "long range") is a physical proprietary radio communication technique. The transmission of information, such as via any of the methods disclosed herein, could further transmit additional information. This could include, but is not limited to, sensor health (battery life, power issues, solar panel strength, cleanliness of the sensor, any other errors), triggered event detection (e.g., bin lid open/closed, wake up, etc.), and/or auger on detection, such as via the accelerometer. Still additional features could be added to the software/programming to acquire additional information during use of the sensor.

The transmitter could be used to transmit data to a separate location, such as a handheld device (smartphone, tablet, smart device, etc.) or a computer. This could be used to transmit data associated with the sensor module and/or the bin to the separate location.

Figure 19:
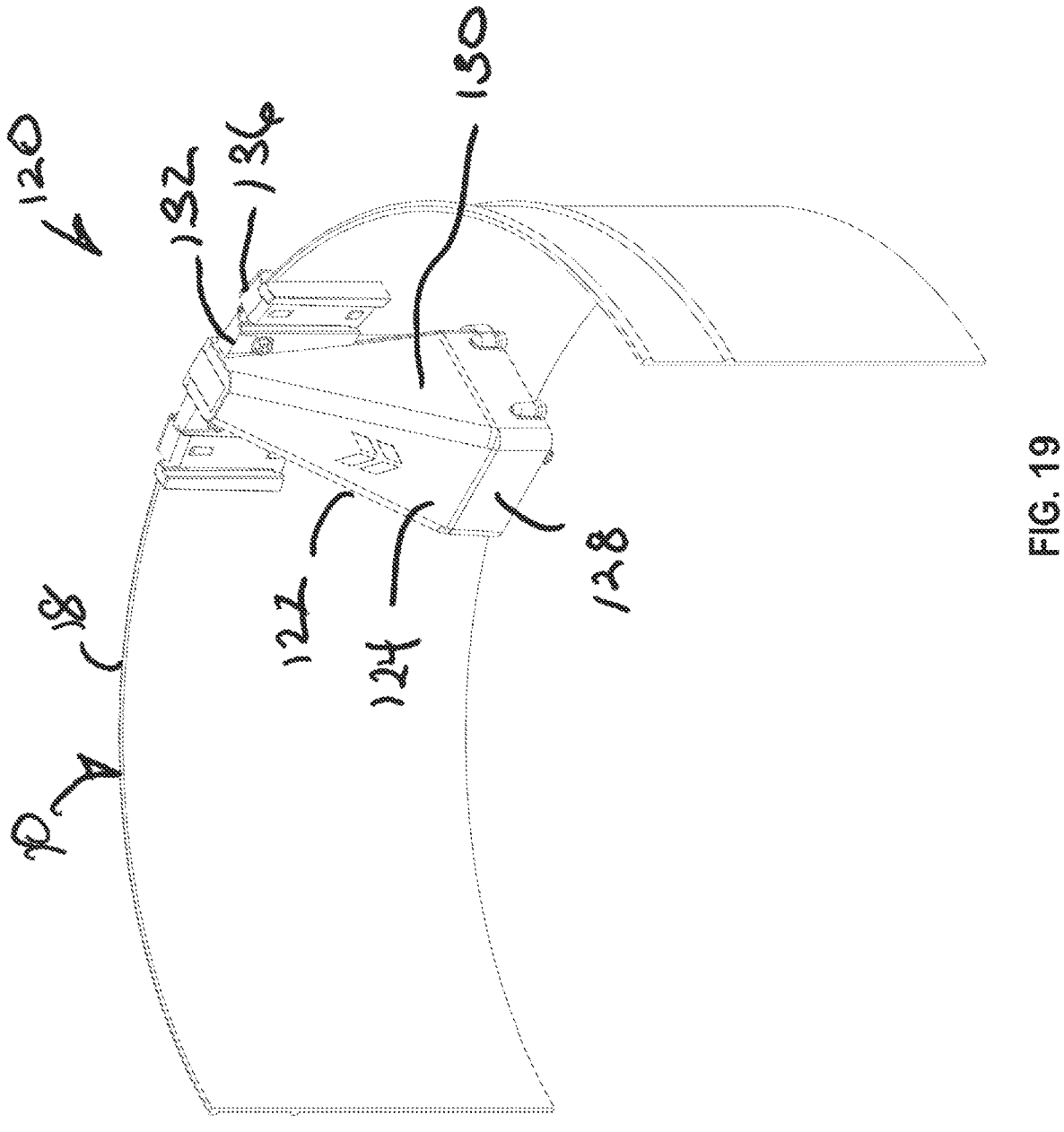
FIG. 19 is another enlarged perspective view of a bin monitoring system mounted to a portion of a bin according to aspects and/or embodiments of the present disclosure.
Figure 20:
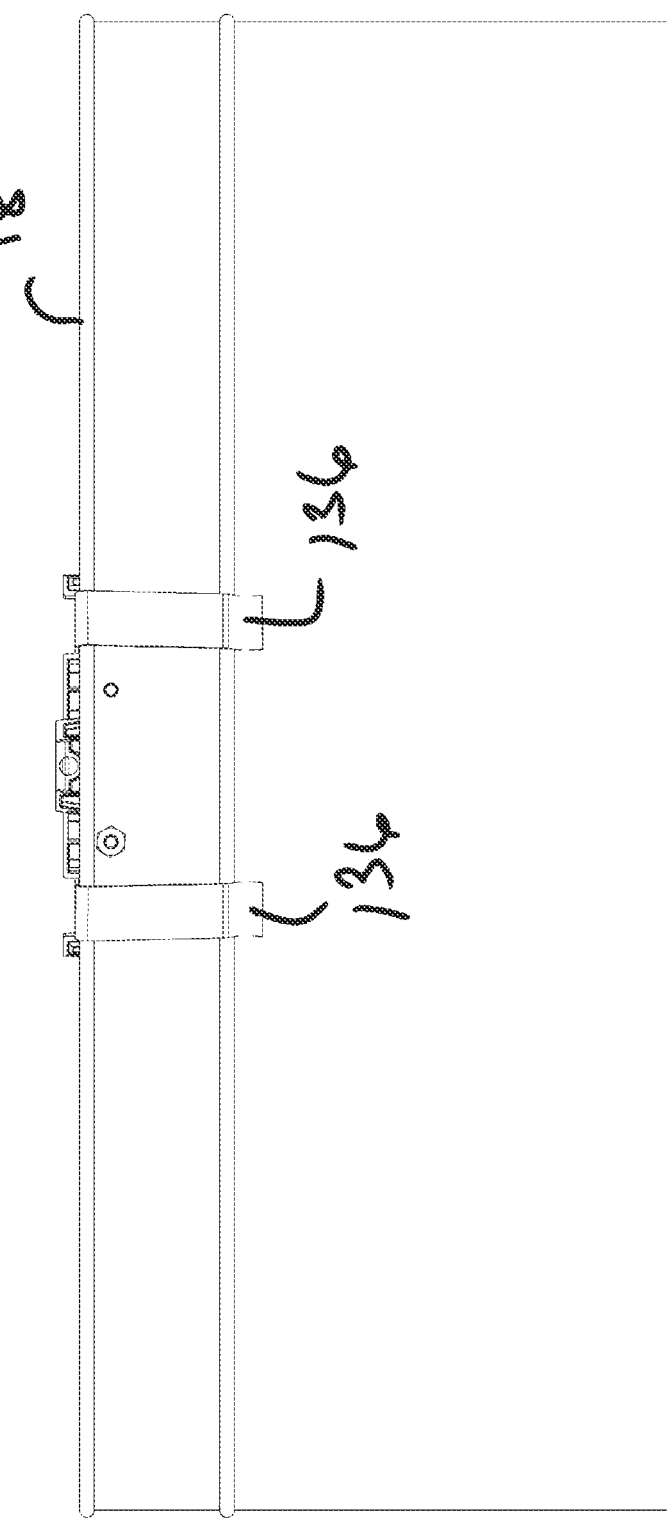
FIG. 20 is a rear view showing the bin monitoring system positioned relative to the bin.

Additional embodiments and/or aspects of the disclosure are shown in FIGS. 19-22. FIGS. 19 and 20 show a bin monitoring system 120 attached to a portion of a bin 10, such as at the rim 18 thereof. The bin monitoring system 120 shown is similar to other figures shown and described herein, including having a housing 122 with portions thereof. There are also clips 136 that surround a portion of the rim 18 of the bin 10. It should be noted that the housing 122 includes a modified shape compared to other figures shown and described herein.

Figure 21:
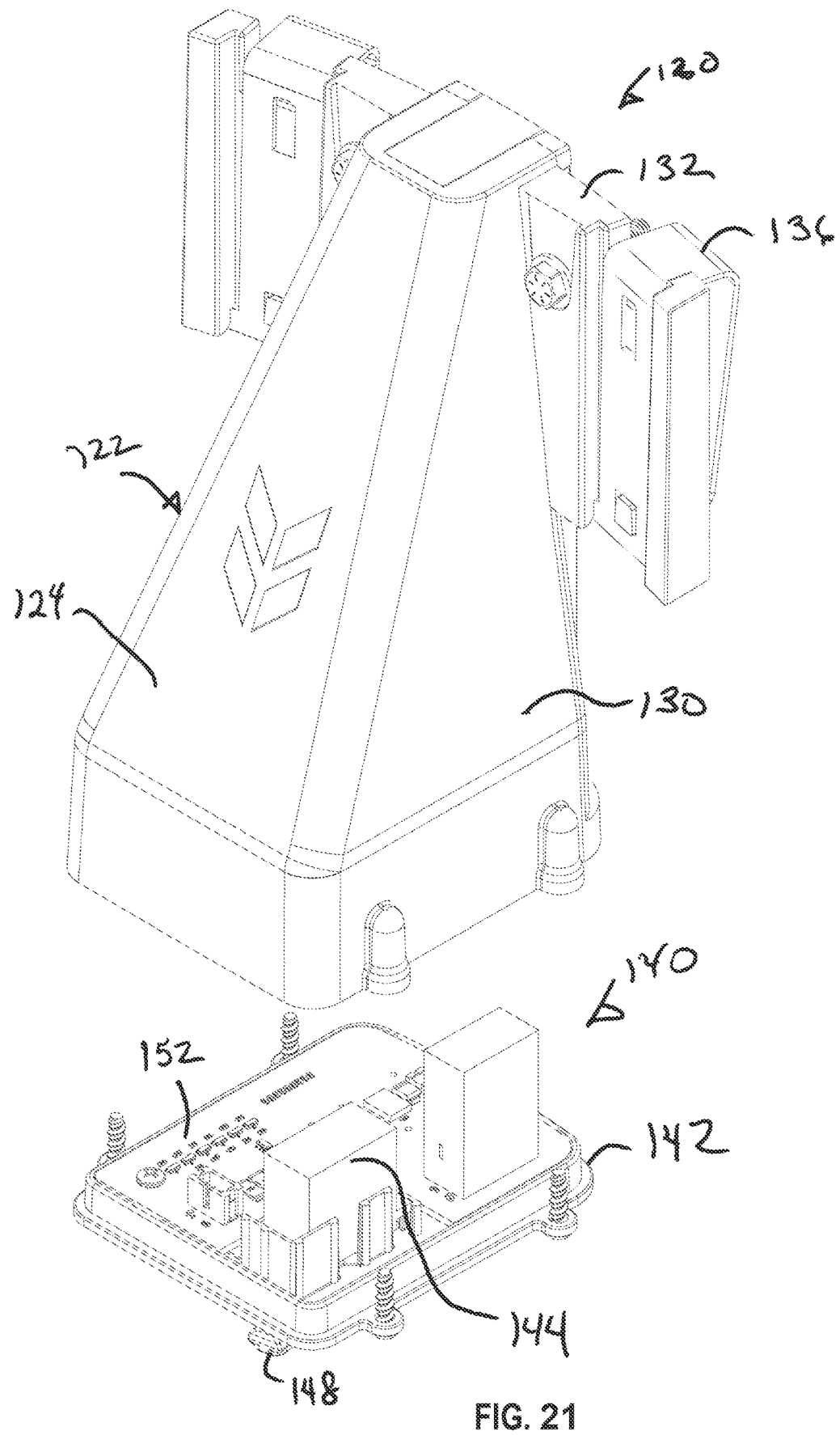
FIG. 21 is an exploded view of the bin monitoring system of FIG. 19.
Figure 22:
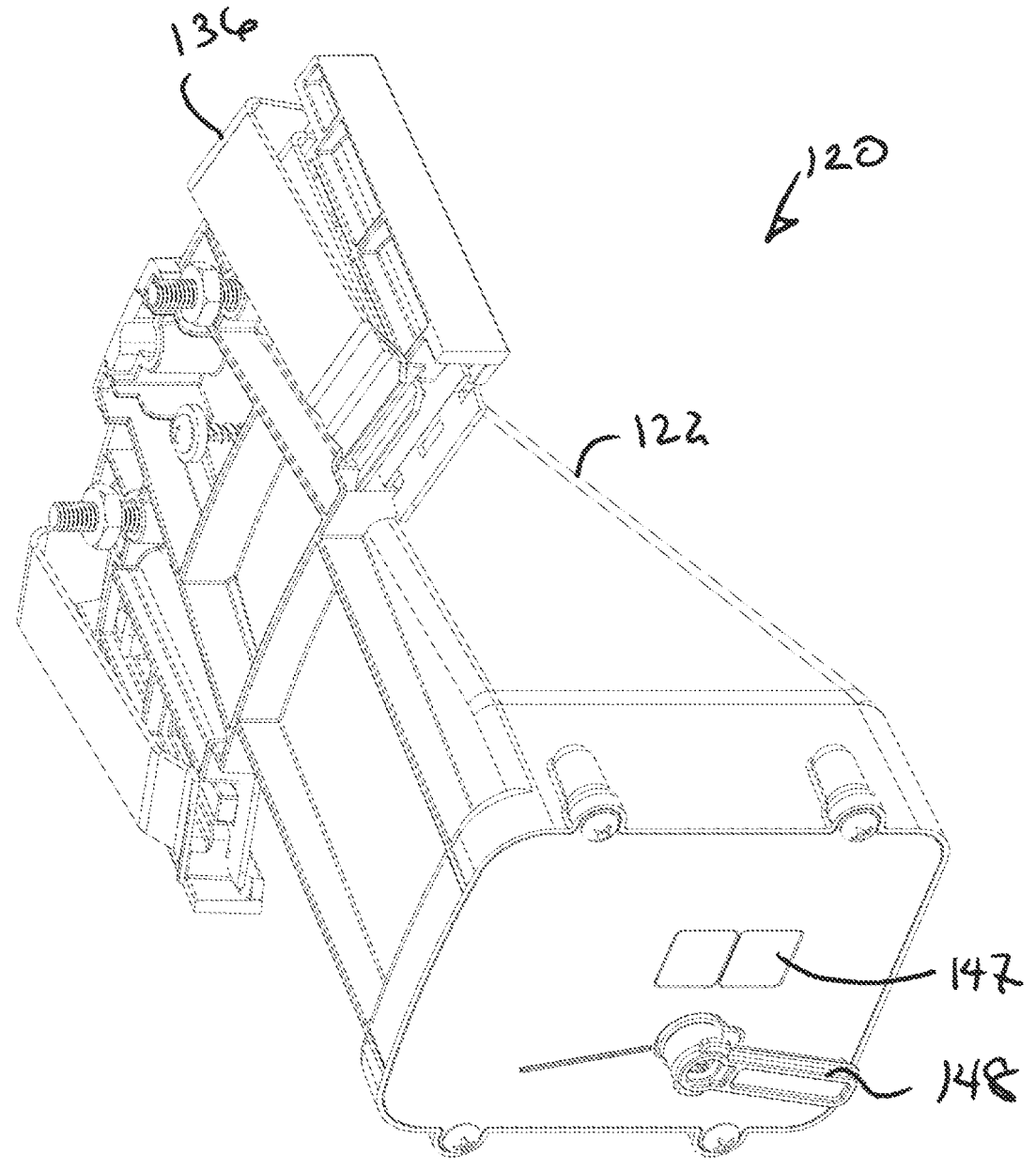
FIG. 22 is a rear, lower perspective of the bin monitoring system of FIG. 19.

In addition, as shown in FIGS. 21 and 22, the lower portion of the housing 122, which may be referred to as the sensor module 140 is attached to the housing 122 in a different manner. A plurality of screws attach to an upper portion of the housing 122 to hold the components of the sensor module 140 in place. Such a configuration places the components of the module 140, including the servo motor 144, circuit board 152 and sensor in a position where they are contained with the housing 122. There are apertures 147 through the module 140 to allow the sensor to view into the bin. Still further, there is shown to include a wiper 148 to aid in keeping the sensor components clean. The wiper could also include the whiskers 149, such as shown in other figures, but these are not required in all embodiments.

Still additionally, while the wipers shown and described provide advantages, such as aiding in the upkeep of the sensor, it should be appreciated that there are additional ways to keep the sensor and/or sensor housing clean. For example, ultrasonic lens cleaning be used with or in place of the wipers in order to aid in keeping the sensor lens in the housing cleaned. With precisely controlled, high-frequency vibrations, ultrasonic cleaning technology can clean glass surfaces. Glass, silicon and polycarbonate lenses all have natural frequencies depending on their shape and thickness. Applying an ultrasonic vibration (or vibration outside the human hearing range) at the natural frequency of these materials will cause them to resonate. Much like how screaming at the natural frequency of a glass object can cause it to resonate to the point of shattering, precisely applying ultrasonic vibration in special patterns using piezo transducers and advanced semiconductors can effectively blast off water, dirt and other contaminants from a surface. The ULC device can be a solid state device that enables cost-effective self-cleaning of the sensors disclosed herein.

Ultrasonic lens cleaning (ULC) devices enable automatic detection and cleaning in cameras and sensors. ULC devices eliminate the need for complex mechanical parts and human intervention in lens cleaning systems with the first purpose-built semiconductors for lens cleaning. The ULC device can include programmable cleaning modes and integrated algorithms for the rapid removal of contaminants such as water, ice, dirt or dust from camera lenses in various environments.

The ULC can be included with the lens of the sensor housing, which is through which the sensor "looks" into the bin. The lens can be a part of the sensor. A piezo transducer can be positioned around a portion of the sensor and between the sensor and the lens. The piezo transducer will provide the vibration to the lens at the appropriate level to provide the cleaning thereof.

Therefore, bin monitoring sensors and manner of mounting have been shown and/or described. It should be noted that any of the aspects of any of the embodiments could be used with any of the other aspects, whether explicitly shown or not, to be combined to create additional embodiments that include any of the components, features, or aspects disclosed. In addition, while many protocols, networks, batteries/power sources, and the like have been included, it should be appreciated that these are provided for descriptive purposes, and it should be appreciated that any equivalents and/or obvious variants of the same should be considered to be a part of the present disclosure.

From the foregoing, it can be seen that the present disclosure accomplishes at least all of the stated objectives.

The invention claimed is:

1. A bin monitoring system, comprising:
    a housing having a downward sloped portion;
    a module housing connected to the housing underneath the downward sloped portion;
    a sensor positioned within the module housing; and
    the module housing connected to a bottom end of the housing.

2. The bin monitoring system of claim 1 further comprising the module housing having a top cover and a base.

3. The bin monitoring system of claim 2 further comprising the module housing having an aperture and a cable extending through the aperture.

4. The bin monitoring system of claim 2 further comprising a sensor module positioned within the module housing, and the sensor positioned at least partially within the sensor module.

5. The bin monitoring system of claim 4 further comprising a motor positioned within the module housing and operatively connected to a wiper having a plurality of whiskers positioned outside the module housing, wherein the wiper is configured to remove debris from the sensor disposed outside the module housing.

6. The bin monitoring system of claim 1 further comprising the housing connected to a rim of an opening at an upper end of a bin.

7. The bin monitoring system of claim 6 wherein the downward sloped portion of the housing extends inwardly and downwardly from the rim towards an interior of the opening.

8. The bin monitoring system of claim 1 further comprising the housing having sides and an open rear.

9. The bin monitoring system of claim 8 further comprising the downward sloped portion extending from a vertical portion.

10. The bin monitoring system of claim 8 further comprising the downward sloped portion extending between a rear vertical portion and a front vertical portion.

11. The bin monitoring system of claim 1 further comprising the housing having a plurality of holes adjacent an upper end of the housing.

12. The bin monitoring system of claim 1 further comprising at least one mount connected to the housing.

13. The bin monitoring system of claim 12 wherein the at least one mount is a clip positioned over a rim of an opening at an upper end of a bin.

14. The bin monitoring system of claim 13 wherein the at least one mount applies a clamping force to the rim.

15. A bin monitoring system, comprising:
a housing having sides, an open rear, and a downward sloped portion positioned between a front vertical portion and a rear vertical portion;
the housing connected to a rim of an opening at an upper end of a bin by a mount, wherein the downward sloped portion extends inwardly and downwardly from the rim towards an interior of the opening;
a module housing having a cover and a base;
the module housing connected to the housing at a bottom end of the housing and underneath the downward sloped portion;
a sensor positioned within the module housing.

16. A bin monitoring system, comprising:
a housing having a downward sloped portion;
a module housing connected to the housing underneath the downward sloped portion;
a sensor positioned within the module housing;
a sensor module positioned within the module housing;
the sensor positioned at least partially within the sensor module; and
a motor positioned within the module housing and operatively connected to a wiper having a plurality of whiskers positioned outside the module housing;
wherein the wiper is configured to remove debris from the sensor disposed outside the module housing.

17. A bin monitoring system, comprising:
a housing having a downward sloped portion;
a module housing connected to the housing underneath the downward sloped portion;
a sensor positioned within the module housing; and
the housing connected to a rim of an opening at an upper end of a bin;
wherein the downward sloped portion of the housing extends inwardly and downwardly from the rim towards an interior of the opening.

18. A bin monitoring system, comprising:
a housing having a downward sloped portion;
a module housing connected to the housing underneath the downward sloped portion;
a sensor positioned within the module housing; and
the housing having a plurality of holes adjacent an upper end of the housing.

19. A bin monitoring system, comprising:
a housing having a downward sloped portion;
a module housing connected to the housing underneath the downward sloped portion;
a sensor positioned within the module housing; and
at least one mount connected to the housing;
wherein the at least one mount is a clip positioned over a rim of an opening at an upper end of a bin.

* * * * *